United States Patent [19]

Carney et al.

[11] Patent Number: 4,662,048

[45] Date of Patent: May 5, 1987

[54] METHOD OF MAKING A SEWER PIPE TESTING APPARATUS

[75] Inventors: Joseph H. Carney, Whittier; Rudy Lozano, Walnut, both of Calif.

[73] Assignee: Carney-Lozano Enterprise Limited, Whittier, Calif.

[21] Appl. No.: 830,466

[22] Filed: Feb. 18, 1986

[51] Int. Cl.$^4$ .............................................. B21D 53/00
[52] U.S. Cl. ................................ 29/157 R; 29/527.1; 264/112; 264/123
[58] Field of Search ................... 29/157 R, 527.1, 530; 138/89, 90; 222/563; 264/112, 123, 36; 285/239, 295

[56] References Cited

U.S. PATENT DOCUMENTS 3,241,571  3/1966  Garcia ................................... 138/90
4,607,664  8/1986  Carney et al. ......................... 138/89

Primary Examiner—Howard N. Goldberg
Assistant Examiner—Ronald S. Wallace
Attorney, Agent, or Firm—Jack C. Munro

[57] ABSTRACT

The method of making a sewer pipe testing apparatus which uses a frangible plug to be installed within the sewage pipe system. The plug is formed by tightly compacting between a pair of mold members a quantity of a powdered substance within a section of a cylinder. The resultingly formed plug is mounted within an annular groove within the cylinder. A movable member is mounted through the side wall of the cylinder and is capable of being moved in contact with the solid plug to cause such to break apart. The solid plug is to be coated on its exterior surfaces by a plastic material which retards dissolving of the plug by water, but which material is ultimately dissolvable within water.

8 Claims, 9 Drawing Figures

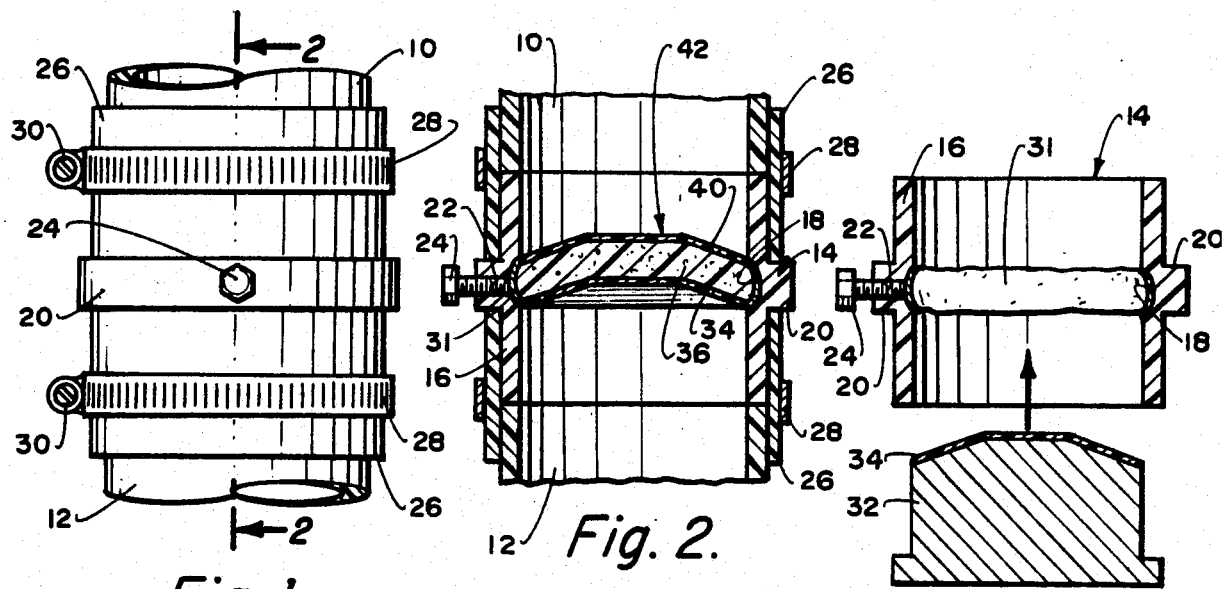
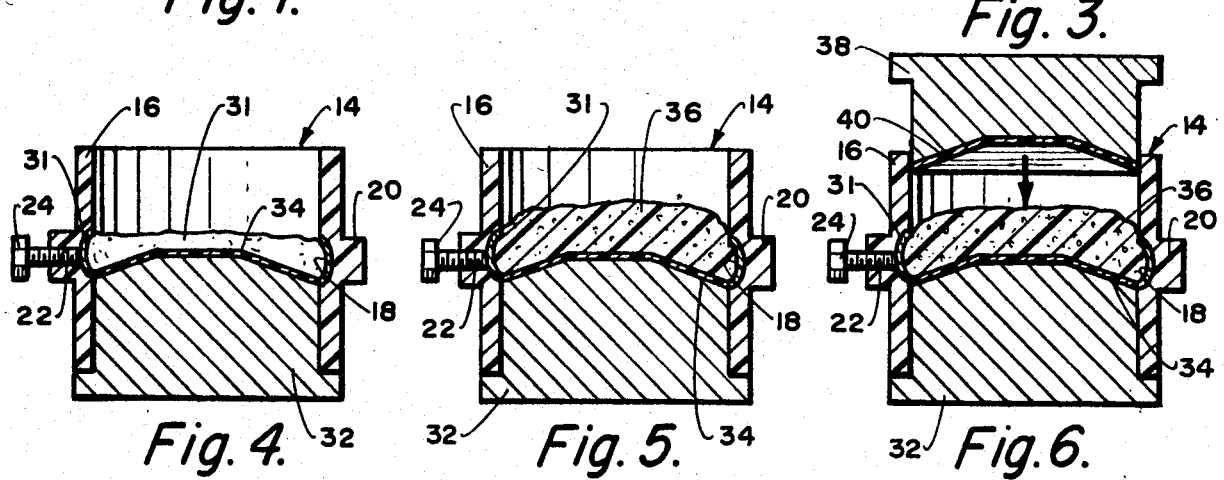
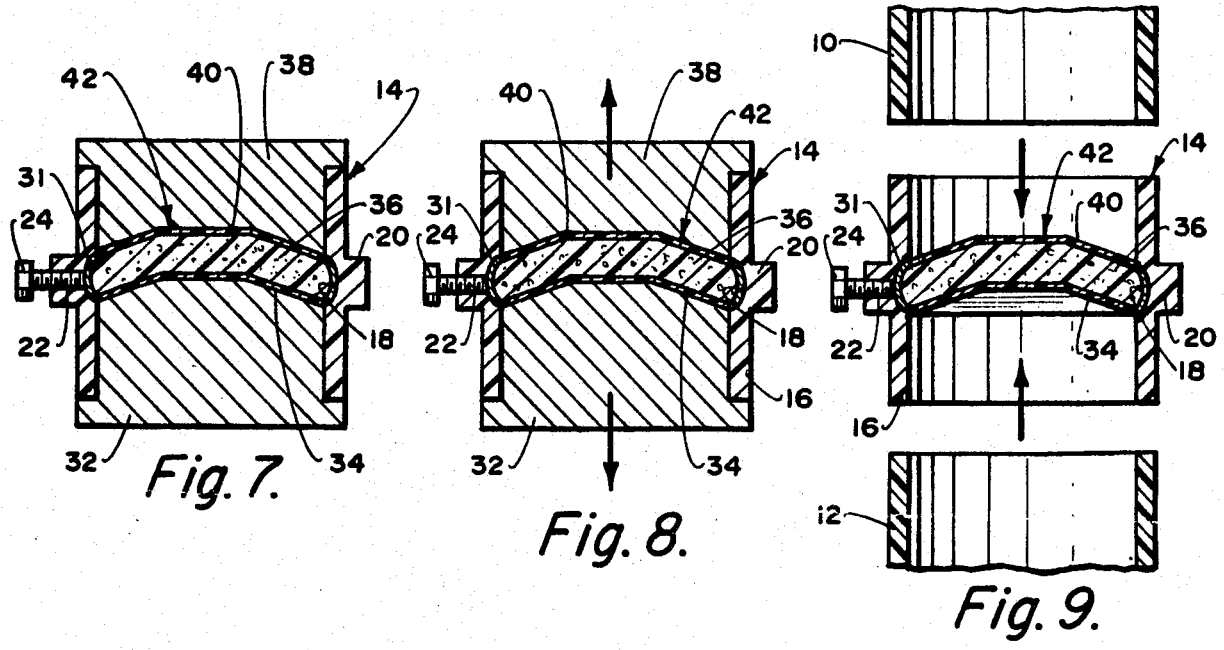

METHOD OF MAKING A SEWER PIPE TESTING APPARATUS

BACKGROUND OF THE INVENTION

The field of this invention relates to plumbing and more particularly to a device which is to be temporarily installed within a plumbing system within a building structure to permit testing, to insure that all the piping connections within the plumbing system are connected in a fluid-tight manner.

In the constructing of any plumbing system within a building or home, it is required by most city and county codes that the plumbing system be tested to make sure that it is leak free. For example, if a multi-story office building is being built, every so many feet in height of the building, it is required to test the plumbing for any possible leaks. The common procedure is to install at an appropriate lower location within the plumbing a specially configured section of pipe which is defined as a "Y" section. The "Y" section has a short outwardly extending pipe which is normally closed. When it is required to test the pipe system, the plumber will open this short section of the pipe and install an inflatable bladder within the pipe and inflates such to tightly close off the discharge outlet gf the pipe system. The plumber then goes to the topmost pipe of the system, that is open, and fills such with water. The plumber then applies pressure to the required level, such as fifty pounds per square inch, and then observes if there are any leaks within any portion of the piping system. The inflatable bladder prevents escape of the water. If there are no leaks, the plumber then deflates the bladder and removes such which causes the water to escape and be discharged within the appropriate sewer located exterior of the building.

Within a forty or fifty story building, it is required that there be a substantial number of these "Y" sections installed. Each "Y" section is expensive and once it is used to affect testing of the system, the "Y" section is never used again. Also, this separate conduit from the "Y" section may provide for a collecting station for debris which can result in clogging of the plumbing system. It is desirable to utilize some form of testing assembly which eliminates the use of this "Y" section with only a normal connection arrangement to be employed between the different sections of pipe.

Reference is to be had to U.S. patent application Ser. No. 787,152, filed Oct., 15, 1985, now U.S. Pat. No. 4,607,664 issued Aug. 26, 1986, entitled, "PLUMBING TEST PLUG APPARATUS", by the present inventors wherein a new and novel testing system is described which utilizes a frangible plug mounted directly within the plumbing system. This frangible plug is capable of being totally dissolved after a period of time by water and, therefore, after the plug has been utilized to affect testing of the plumbing apparatus, the plug is broken and discharged through the plumbing system to hence be dissolved.

The structure of the aforementioned patent application is directed to utilizing of a flexible walled sleeve within which is located the frangible plug. When it is desired to break the plug, the flexible walled sleeve is squeezed until the plug breaks.

The structure of the present invention utilizes the concept of a frangible plug, but without the use of the flexible walled sleeve. The structure of this invention is directed to the method of making a pipe testing apparatus which uses the frangible plug being mounted within a rigid walled sleeve.

SUMMARY OF THE INVENTION

The method of the present invention relates to the making of a sewer pipe testing apparatus which utilizes a frangible, biodegradable plug within a section of the sewer pipe. This section of sewer pipe is to be attached within the conventional sewer pipe line at a particularly selected location by conventional available devices which are used to secure sections of sewer pipe together. The section of pipe which is to contain the frangible plug is formed of a rigid wall which has an internal cylindrical chamber within which is formed an annular groove within the wall of the chamber. A male mold member is to be locatable within the internal chamber and positioned directly adjacent this annular groove. Prior to being inserted within the internal chamber, the molding surface of the male mold member may be coated with a plastic material. Also, prior to locating of the male mold member within the internal chamber, the annular groove is coated with a liquid adhesive. With the male mold member in its proper position within the internal chamber, a quantity of powdered substance is poured into the internal chamber overfilling to a certain degree the annular groove. A female mold member has its molding surface similarly coated with a plastic material. The female mold member is then placed within the internal chamber in a close fitting manner and is moved toward the male mold member a certain pre-established amount which causes compressing and fusing together of the powdered material into a rigid solid structure forming a frangible plug. The mold members are then removed from the internal chamber leaving a solid plug in its established position. Mounted within the wall of the cylinder is a member which can be moved to penetrate the area defined by the annular groove. When it is desired to break the solid member, the movable member is moved into engagement with the solid plug and affect breaking of such.

BRIEF DESCRIPTION OF THE DRAWING

FIG. 1 is an elevational view of a section of a typical plumbing pipe system within which the subject matter of the present invention is utilized;

FIG. 2 is a cross-sectional view taken along line 2—2 of FIG. 1 showing the interior of the pipe system;

FIG. 3 is a cross-sectional view showing the insertion of the male mold member within the pipe section to begin forming of the plug;

FIG. 4 is a view similar to FIG. 3 showing the male mold member completely installed in position within the pipe section;

FIG. 5 is a view similar to FIG. 4 showing in addition the depositing of the powdery substance within the pipe section which ultimately will be formed into a solid plug;

FIG. 6 is a view similar to FIG. 5, but showing additionally the insertion of the female mold member within the internal chamber of the cylinder;

FIG. 7 is a view similar to FIG. 6, but showing the female member in the fully inserted position relative to the male mold member which has compressed the powdered substance into the configuration of the solid plug;

FIG. 8 is a view similar to FIG. 7 depicting the movement of both the mold members from the internal chamber; and FIG. 9 is cross-sectional view of the pipe testing apparatus of this invention shown in usable form depicting its placement within a conventional pipe system.

DETAILED DESCRIPTION OF THE SHOWN EMBODIMENT

Referring particularly to the drawing there is shown a pair of conventional sewer pipes 10 and 12. These sewer pipes 10 and 12 will normally be constructed of a plastic, clay or metallic material. Generally, the pipes 10 and 12 will be oriented in a vertical direction. That is the sewage material will be conducted from pipe 10 into pipe 12 and this will be the direction of flow. Located between pipes 10 and 12 is the pipe testing apparatus 14 of this invention. Basically, the pipe testing apparatus 14 includes a cylindrically shaped member 16 which in essence comprises a small section of pipe. This member 16 will normally be constructed of a rigid material such as plastic, alluminum, stainless steel or the like. The rigid section 16 includes an internal chamber within which is formed an annular groove 18. This groove 18 can be formed within the wall of the internal chamber at the time the cylinder 16 is formed, or can be cut into the internal chamber after the forming of the cylinder 16. Also, it is considered to be within the scope of this invention that the downstream edge of the groove 18 could be defined to be more pronounced than the upstream edge. The reason for this is to provide a wall surface which tends to hold in place the solid plug (to be described) once it is formed and in location within the annular groove 18.

Formed on the exterior surface of the cylinder 16 is an annular protuberance 20. Within the annular protuberance 20 is located a threaded opening 22. Within this threaded opening 22 is mounted a threaded enlarged headed fastener 24. This fastener 24 connects with the annular groove 18.

With the cylinder 16 in contact with the pipe 12, there is located thereover a flexible sleeve 26. A typical material of construction of this sleeve 26 would be rubber. Mounted about the sleeve 26 is a clamping band 28 which can be tightened by means of a worm gear fastener assembly 30. It is to be noted that there is also shown a similar type of sleeve 26 located about the connection between the cylinder 16 and the pipe 10. Also located about this sleeve 26 is a clamping band 28 which is again to be tightened by means of worm gear fastener 30. These clamping bands 28 are deemed to be what is conventionally known as "hose clamps". Although there is only shown a single clamp 28 about each sleeve 26, in actual practice there will probably be used at least two in number of bands 28, located spaced apart, about each sleeve 26.

Referring particularly to FIG. 3 of the drawing, the fastener 24 is loosened sufficiently so as not to protrude into the area defined by the annular groove 18. A liquid adhesive 31 of any conventional type is to be brushed or otherwise applied the entire area defined by the annular groove 18. Then a male mold member 32 has a plastic coating 34 applied to its molding surface. This plastic coating 34 can be in liquid form and brushed or otherwise painted thereon, or it could be in sheet form and just merely placed thereon. The molding surface of the mold member 32 will normally include some kind of release agent to make sure that the plastic material 34 will remain with the resultingly formed solid plug upon retraction of the mold member 32 after the molding operation.

It is imperative that the plastic coating 34 be dissolvable within water. It has been found that one desirable material for the coating 34 would be a polyvinyl alcohol film. This material is non-toxic and absorbs moisture slowly until finally the material dissolves. The thicker the material, the slower the rate of dissolving. However, a typical rate for dissolving of a thin film would be about three days. This is the preferred length of time for the dissolving to occur.

The mold member 32 is then placed within the internal chamber of the cylinder 16 and located so that the coating 34 is located directly adjacent the annular groove 18. It is to be noted that the mold member 34 is positioned within the internal chamber 16 in a close fitting manner. This positioning of the mold member 32 is clearly shown in FIG. 4.

A desired quantity of a powdered substance 36 is then poured into the internal chamber of the cylinder 16 overfilling the area defined by the annular groove 18. This is clearly shown in FIG. 5 of the drawing. The amount of overfilling will be pre-determined so that at each time the exact amount of powdered substance 36 will be supplied within the internal chamber. A typical powdered substance would contain possibly a water soluble adhesive mixed with soybean meal, a starch such as flour, possibly even a sugar, a bicarbonate or baking soda. Again, it is just important that the ingredients of the substance 36 be totally and completely dissolvable within water.

A female mold member 38 is then utilized which has a coating 40 applied to its molding surface. The substance of the coating 40 is identical to that of coating 34. This mold member 38 is then located within the internal chamber of the cylinder 16 in a close fitting manner and moved against the powdered substance 36. Pressure is applied between the mold members 32 and 38 compressing of the powdered substance 36 causing such to be formed into a solid mass forming a plug 42. Formation of this plug 42 is clearly shown in FIG. 7 of the drawing.

At this time mold members 32 and 38 are removed from the internal chamber of the cylinder 16 leaving only the resultingly formed pipe testing apparatus 14. This pipe testing apparatus 14 is then to be connected between the pipes 10 and 12 as shown in FIG. 1. When it is desired to test the pipes, water will be supplied within the upper level of the pipe system of which pipe 10 is a part, completely filling such, and being prevented from being discharged by means of the plug 42. Pressure will then be applied to this water to ascertain if any leaks arise. If no leaks do arise, the plumber will then turn fastener 24 causing such to engage with the peripheral edge of the plug 42. This engagement of the fastener 24 is to continue until sufficient pressure is applied to the plug 42 that will cause such to break. Once the plug 42 is broken, the water being conducted from pipe 10 into pipe 12 to be removed from the annular groove 18 and be discharged through pipe 12 and eventually into a conventional sewer line. Normally the fastener 24 will then be "backed-up" a sufficient amount so that it will no longer extend within the confines of the annular groove 18. This is so that the protrusion of the fastener 24 will not tend to collect any debris which might cause clogging of the sewer line at some later time.

What is claimed is:
1. The method of making a sewer pipe testing apparatus comprising the steps of:

utilizing a section of thin walled, open-ended cylinder having an internal chamber;

forming an annular groove within the wall of the internal chamber;

mounting a force applying device within the wall of the cylinder and connecting the force applying device with the annular groove;

locating of a male mold member within one end of the cylinder in a close fitting relationship with the internal chamber;

positioning of the molding surface of the male member directly adjacent the annular groove;

depositing a sufficient quantity of a powdered substance within the internal chamber against the molding surface of the male member;

inserting a female mold member within the other end of the cylinder in a close fitting relationship within the internal chamber;

forcibly pressing together the mold members compressing the powdered substance into a solid; and removing the mold members from the internal chamber of the cylinder.

2. The method as defined in claim 1 wherein prior to the depositing step:

applying an adhesive entirely along the surface of the annular groove.

3. The method as defined in claim 1 including the additional step of:

applying a plastic coating to all exposed surfaces of the solid formed by compressing of the powdered substance.

4. The method as defined in claim 3 wherein:

the applying step is achieved by applying of a coating on the molding surfaces of both the male mold member and the female mold member which then adheres to the resultingly formed solid after the removing step.

5. The method as defined in claim 2 including the additional step of:

applying a plastic coating to all exposed surfaces of the solid formed by compressing of the powdered substance.

6. The method as defined in claim 5 wherein:

the applying step is achieved by applying of a coating on the molding surfaces of both the male mold member and the female mold member which then adheres to the resultingly formed solid after the removing step.

7. The method as defined in claim 1 wherein the mounting step includes:

utilizing a member which can be physically moved into contact with the solid causing the solid to break apart.

8. The method as defined in claim 6 wherein the mounting step includes:

utilizing a member which can be physically moved into contact with the solid causing the solid to break apart.

* * * * *